Oct. 2, 1951 T. W. KENYON 2,570,130
GYROSTABILIZED SIGHTING INSTRUMENT
Filed April 8, 1950 2 Sheets-Sheet 2
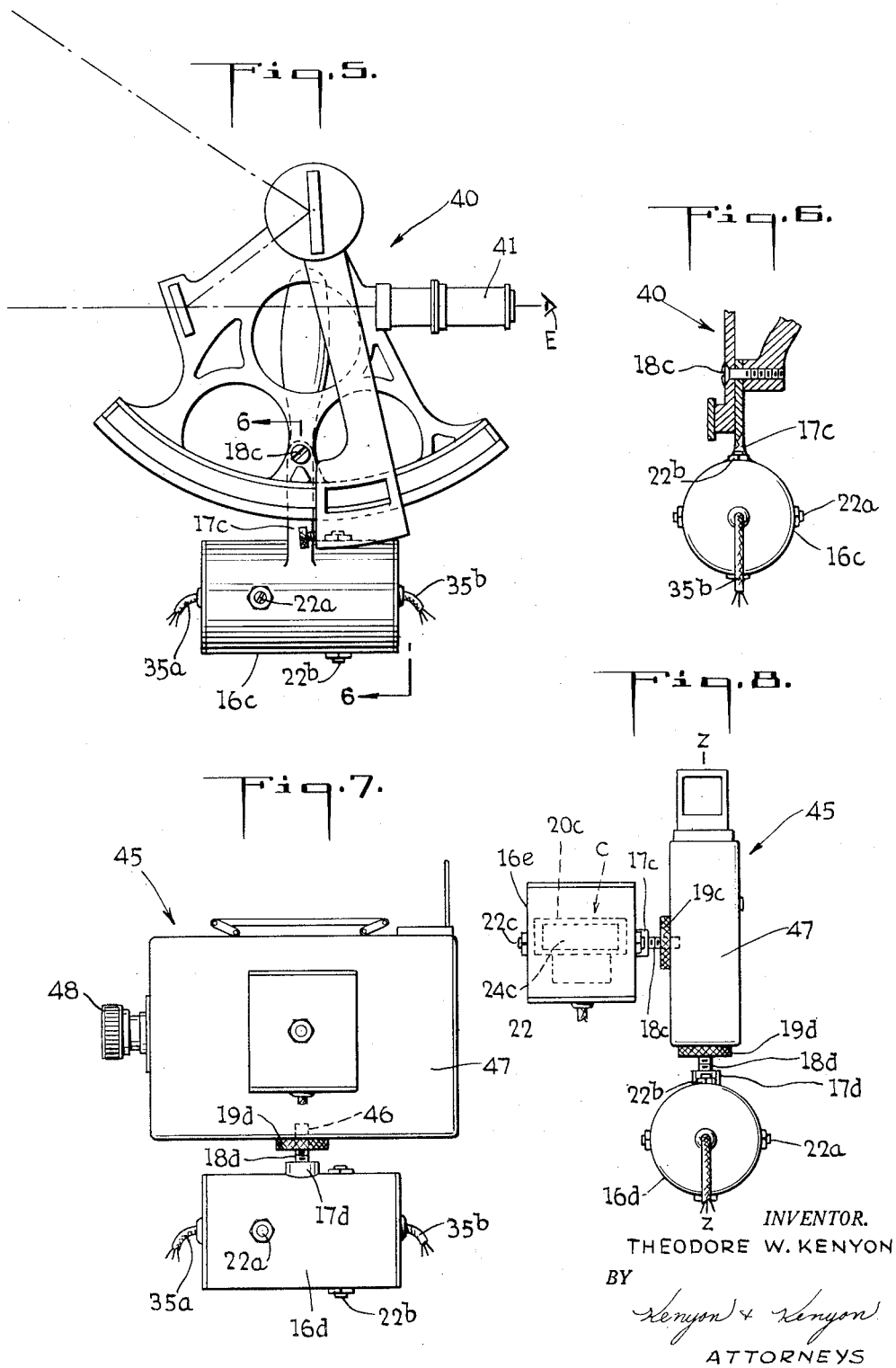
INVENTOR.
THEODORE W. KENYON
BY
Kenyon & Kenyon
ATTORNEYS

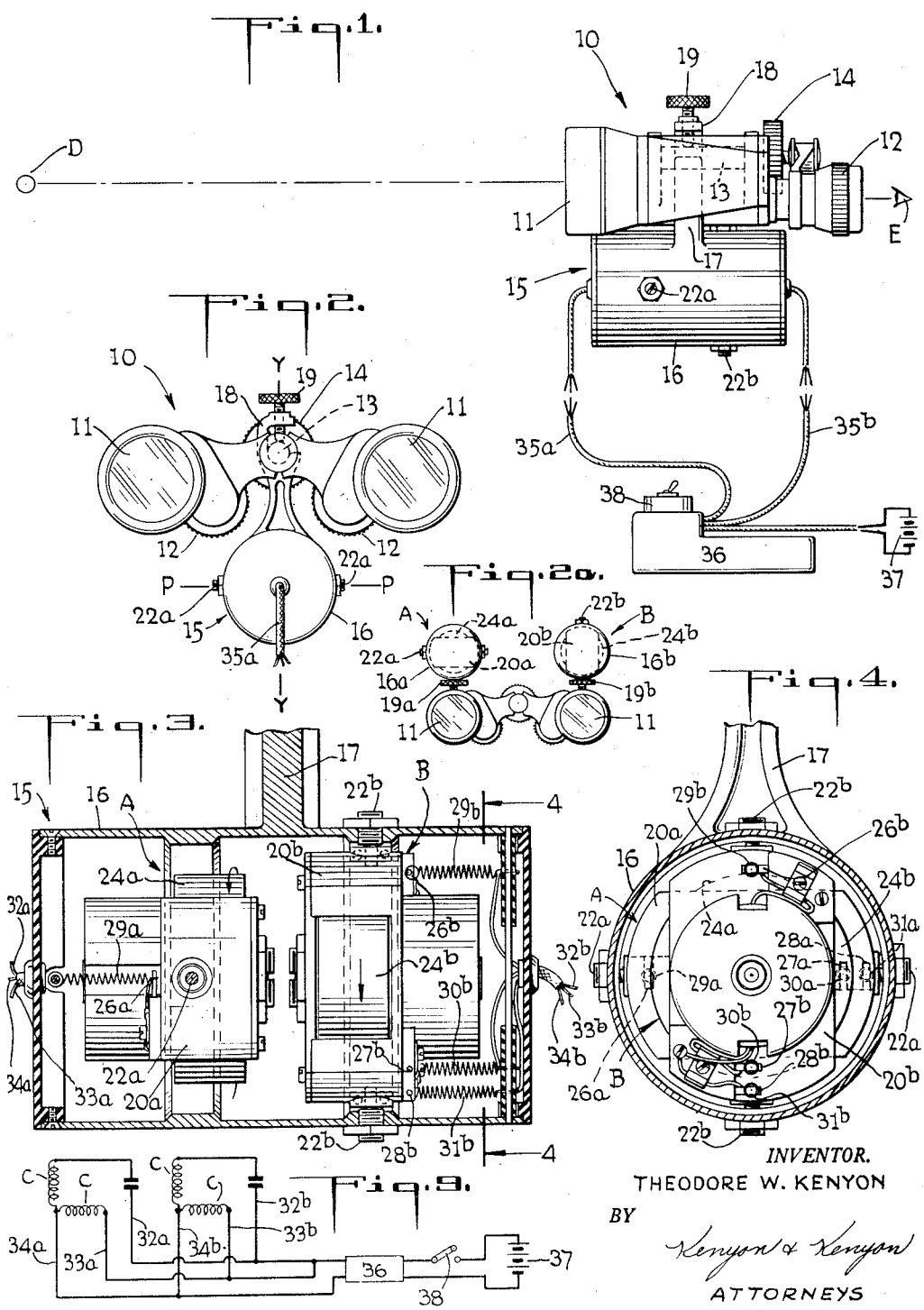

Patented Oct. 2, 1951

2,570,130

UNITED STATES PATENT OFFICE 2,570,130

GYROSTABILIZED SIGHTING INSTRUMENT

Theodore W. Kenyon, Huntington, N. Y., assignor to Kenyon Gyro & Electronics Corporation, Huntington, N. Y., a corporation of New York Application April 8, 1950, Serial No. 154,789

3 Claims. (Cl. 74—5.22)

This invention relates to gyro stabilizers for use particularly with hand-held instruments such as binoculars, sextants, cameras and the like.

Users of hand-held instruments of the character described usually have great difficulty in securing a sharp image of the object under observation within the line of sight because of instrument vibrations resulting from hand tremor or vibration, or other motion which blur the image of the observed object or target sufficiently to make it so hazy as to destroy its clarity completely. This is especially true where high magnification is present because it emphasizes the effects of tremors, vibrations or other outside motion. An object and feature of the invention is to provide a simple gyroscopic stabilizer arrangement which is attachable to sighting devices of the character described and which will effectively eliminate tremors or vibrations, eliminate the haze or blur to produce a well defined image and to provide increased acuity of the image in the field of view. In fact, provision of such an arrangement often requires refocusing of the sighting device after its application because the blur or haze rendered it impossible to focus accurately prior to application of the stabilizing means.

Another object and feature of the invention is to provide simple stabilizing structure that is readily and quickly attachable to and detachable from existing sighting devices without material modification of the latter.

A further object and feature of this invention is to provide simple means for supplying motive power to the stabilizing device.

Other objects and features of the invention will become apparent from the following specification and drawings wherein:

Fig. 1 is a side elevational view of binoculars equipped with a stabilizing device of this invention;

Fig. 2 is an end elevational view of the device of Fig. 1 viewed from the left;

Fig. 2a is a similar end elevational view of a modified construction;

Fig. 3 is a longitudinal section of the stabilizing device of Figs. 1 and 2;

Fig. 4 is a transverse section taken along line 4—4 of Fig. 3 and viewed in the direction of the arrows;

Fig. 5 is a side elevation of a sextant to which a stabilizing device embodying the invention has been attached;

Fig. 6 is a section taken along line 6—6 of Fig. 5 and viewed in the direction of the arrows;

Fig. 7 is a side elevation of a camera to which stabilizing devices embodying the invention have been attached;

Fig. 8 is an end elevation seen from the right of Fig. 7; and

Fig. 9 is a diagrammatic view of an electric circuit for operating the gyros.

In the drawing, 10 denotes as a sighting device binoculars of conventional construction embodying a pair of lens systems 11 with eye pieces 12 supported symmetrically relative a center rod 13 which latter carries the usual focusing screw and knob 14.

A stabilizing unit 15 adapted to stabilize the binoculars 10 about both pitch and yaw axes is secured to the binoculars 10. This unit 15 consists of a tubular casing 16 to which a securing bracket 17 is attached in any desired way. The bracket 17 has a hook-like clamp 18 at its outer end that may be hooked about the center rod 13 of the binoculars and clamped in place by a set screw 19 to maintain the container or casing 16 in a removably fixed position relative to the binoculars with its axis parallel to the sighting axis of the sighting device, e. g., axis of rod 13. In Figs. 1–4 inclusive, the casing is underslung relative to the binoculars. This is not essential as it may be located elsewhere.

A pair of spaced-apart gyros A and B are mounted in the casing 16. These gyros comprise gyro frames 20a, 20b which are rotatively supported on pairs of trunnions 22a, 22b so that the respective frames 20a, 20b may rotate freely about the axes that are perpendicular to each other. In the embodiment shown, the axis of the trunnions 22a is horizontal and that of trunnions 22b is vertical. Electrically driven gyro rotors 24a, 24b are supported, the first from frame 20a and the other from frame 20b. The axes of the two rotors 24a and 24b are perpendicular to the axis of the trunnions 22a and 22b of the respective frames 20a and 20b.

The electric stator windings (not shown) of the gyros A and B are mounted in suitable manner in the respective frames 20a, 20b and their terminals 26a, 27a, 28a and 26b, 27b, 28b, insulated from each other, are connected by non-movement interfering light springs 29a, 30a, 31a and 29b, 30b, 31b in parallel to wires 32a, 33a, 34a and 32b, 33b, 34b of three wire cables 35a, 35b. The wires of these cables at their opposite ends are connected to an inverter 36 which delivers alternating current of required voltage and frequency to the wires of cables 35a and 35b and is powered by a battery 37. A conventional switch 38 controls the current supply of inverter 36. Other simple means for supplying electric or other motive power to the rotors may be utilized. For example, the motive power may be direct as well as alternating current, or, as is known in the art, compressed air may be utilized to drive the rotors.

The action of the stabilizer can be considered first for a single gyro. The stabilization axis is defined as that axis of the instrument which the particular gyro under discussion is stabilizing. The gyro action is such that at all times, the torques about the stabilization axis are in balance with the precession rate of the gimbal axis and torques about the gimbal axis are in balance with the precession rate about the stabilization axis. Any tendency of the instrument to rotate about the stabilization axis produces a torque causing a proportional precession rate of the gimbal axis. The torque required in producing this precession represents the familiar "gyro rigidity" being applied to the stabilization axis. Without the spring restraint on the gimbal, the instrument would be unable to follow (panoram, track) an object in steady rotation since the "gyro rigidity" would hold back the instrument until the gimbal deflected to its stop. With the spring restraint, the gimbal rotates against the spring until a torque is obtained about the gimbal axis to balance any "tracking" precession rate about the stabilization axis. The spring restraint allows torque free tracking about the stabilization axis. When the binoculars, etc., come to rest after tracking, the spring insures that the gimbal returns to its undeflected position.

With the spring restraint, the precession rate about the gimbal axis occurs not in steady state tracking but during changes in tracking rate. Thus torques are provided about the stabilization axis which are proportional to and act against accelerations of the stabilization axis.

Since the gimbal deflection against the spring restraint is proportional to the tracking rate, it is necessary to design the spring so that the gimbal does not hit its stop at the maximum design tracking rate. On the other hand, too stiff a restraint reduces the amount of gyro precession and hence precession rate available to provide torques against the accelerations about the stabilization axis. Similar considerations apply to a second gyro and hence the springs of both gyros herein described must be adapted to meet the foregoing requirements.

*Operation*

In operation, the casing 16 containing gyros A and B is secured to the center rod 13 of the binoculars 10 by clamp 18 and clamp nut 19 with its axis parallel to that of shaft or rod 13. The switch 38 is turned on supplying electric power to drive the gyro rotors 24a and 24b. Since the gyro frames 20a and 20b of the two rotors are supported for rotation on perpendicular axes, the gyro A comprising frame 20a and rotor 24a acts to stabilize the binoculars 10 about the yaw axis Y—Y (Fig. 2) while gyro B comprising frame 20b and rotor 24b acts to stabilize the binoculars 10 about the pitch axis P—P (Fig. 2). In consequence, the binoculars 10 tend to remain steady on the line of sight from eye E to object D and to resist positional changes resulting from tremors, vibrations or other unsteadiness. The object D, therefore, is sharp and neither blurred nor hazy.

*Modified construction (Fig. 2a)*

It is not essential that the gyros A and B be mounted in a single casing. Each, as shown in Fig. 2a, may be mounted in separate casings 16a and 16b. These casings 16a and 16b are then removably mounted from the binocular frame, one 16a being supported, for example, from one of the two lens systems and the other 16b being supported from the second of the two lens systems. The casings are so positioned that axes of rotation of the two rotors 24a and 24b of the gyros A and B are parallel with the line of sight, while the gyro frames carrying the rotors are supported for rotation on mutually perpendicular axes in the same way as when both gyros A and B are carried within a single casing 16. Centralizing springs like those of Figs. 1 to 4 are utilized for the same purposes.

Operation is substantially the same gyro A stabilizing the binoculars about the yaw axis and gyro B stabilizing the binoculars about the pitch axis.

*Modification (Figs. 5 and 6)*

As shown, in Figs. 5 and 6, the stabilizer casing 16c embodying the gyro structures of Fig. 3 described above may be utilized on other sighting devices, for example, on the sextant 40 by attachment of the securing bracket 17c to the handle of the sextant by a screw 18c so that the stabilizing unit is supported and has its axis extending in parallelism with the axis of the sextant's eyepiece 41.

*Modification (Figs. 7 and 8)*

As shown in Figs. 7 and 8, the stabilizing unit 16d embodying the gyros A and B hereinbefore described is utilized for stabilization of a movie camera 45 about the pitch and yaw axes, for example, by screwing a threaded portion 18d of its securing bracket 17d into a threaded socket 46 in the casing 47 of the camera and secured thereto by lock nut 19d to maintain the gyro casing secured relative to camera casing 47 with its axis parallel to the axis of the camera lens systems 48 and substantially coplanar therewith. Optionally, a third gyro C within a separating casing 16e is supported from the camera casing in similar manner. If desired, this third gyro C could be within casing 16c. The rotor 24c of this third gyro C is normally vertical within the gyro frame 20c. The latter in turn is mounted for free rotation in bearings (not shown) on pairs of trunnions 22c so that the frame 20c may rotate about an axis perpendicular to the axes of the frames 20a, 20b of the other two gyros A and B. This third gyro then acts to produce stability about a roll axis Z—Z. The third gyro could be used with each of the earlier modifications as well.

Either in the case of the sextant 40 or camera 45, the stabilizing gyros within casings 16c or 16d act to stabilize the devices to which they are attached relative to pitch and yaw axes and these actions tend to hold the object sharply defined resisting blurring or haze that would be caused by tremors, vibrations or other unsteadiness. In addition, if the third gyro C is added, additional stability on the roll axis is provided.

The use of stabilizers as described is indicated in conjunction with other sighting devices wherein it is desirable to maintain a sharp image in the line of sight.

The electric circuit is illustrated diagrammatically in Fig. 9. Therein the field coils C of the stators are connected by wires 32a, 33a, 34a and 32b, 33b, 34b in parallel to the inverter 36 which in turn is connected to the battery 37 through switch 38 thereby providing A. C. supply to these coils from the direct current source 37. D. C. supply may be used if the gyro motors are adapted for D. C. operations. In the alternative, the rotors may be driven by compressed gas, or spring windings, or in other suitable ways.

While specific embodiments have been disclosed, variations in structural detail within the scope of the claims is possible and is contemplated. There is no intention, therefore, of limitation to the exact details shown and described.

What is claimed is:

1. In combination with a sighting device, a tubular casing, a securing member attached to said casing and means thereon for attaching it to said sighting device to maintain said casing with its axis parallel to the sighting axis of said device, a gyro frame within said casing, means for supporting said frame within said casing for rotation about a horizontal axis, a rotor rotatively supported by said frame for rotation about an axis perpendicular to the axis of rotation of the frame, a second gyro frame within said casing, means for supporting said second frame within said casing for rotation about a vertical axis, a rotor rotatively supported by said second frame for rotation about an axis perpendicular to the axis of rotation of said second frame, and spring restraint means for each gyro frame.

2. In combination with a sighting device, a tubular casing, a securing member attached to said casing and means thereon for attaching it to said sighting device to maintain said casing with its axis parallel to the sighting axis of said device, a frame within said casing, means for supporting said frame within said casing for rotation about a horizontal axis, a rotor rotatively supported by said frame for rotation about an axis perpendicular to the axis of rotation of the frame, a second frame within said casing, means for supporting said second frame within said casing for rotation about a vertical axis, a rotor rotatively supported by said second frame for rotation about an axis perpendicular to the axis of rotation of said second frame, spring restraint means for each frame, and driving means for rotating the two rotors.

3. In combination with a sighting device, a tubular casing, a securing member attached to said casing and means thereon for attaching it to said sighting device to maintain said casing with its axis parallel to the sighting axis of said device, a frame within said casing, means for supporting said frame within said casing for rotation about a horizontal axis, a rotor rotatively supported by said frame for rotation about an axis perpendicular to the axis of rotation of the frame, a second frame within said casing, means for supporting said second frame within said casing for rotation about a vertical axis, a rotor rotatively supported by said second frame for rotation about an axis perpendicular to the axis of rotation of said second frame, spring restraint means for each frame, a source of electric power, electrical driving means for said rotors, and electrical connections between said source and driving means.

THEODORE W. KENYON.

REFERENCES CITED

The following references are of record in the file of this patent:

UNITED STATES PATENTS

| Number | Name | Date |
| --- | --- | --- |
| 796,893 | Brennan | Aug. 8, 1905 |
| 940,329 | Krell | Nov. 16, 1909 |
| 1,363,861 | Fiske | Dec. 28, 1920 |
| 1,573,343 | Holeka | Feb. 16, 1926 |
| 1,645,079 | Titterington | Oct. 11, 1927 |
| 2,371,368 | Wallace | Mar. 13, 1945 |